Patented June 26, 1945

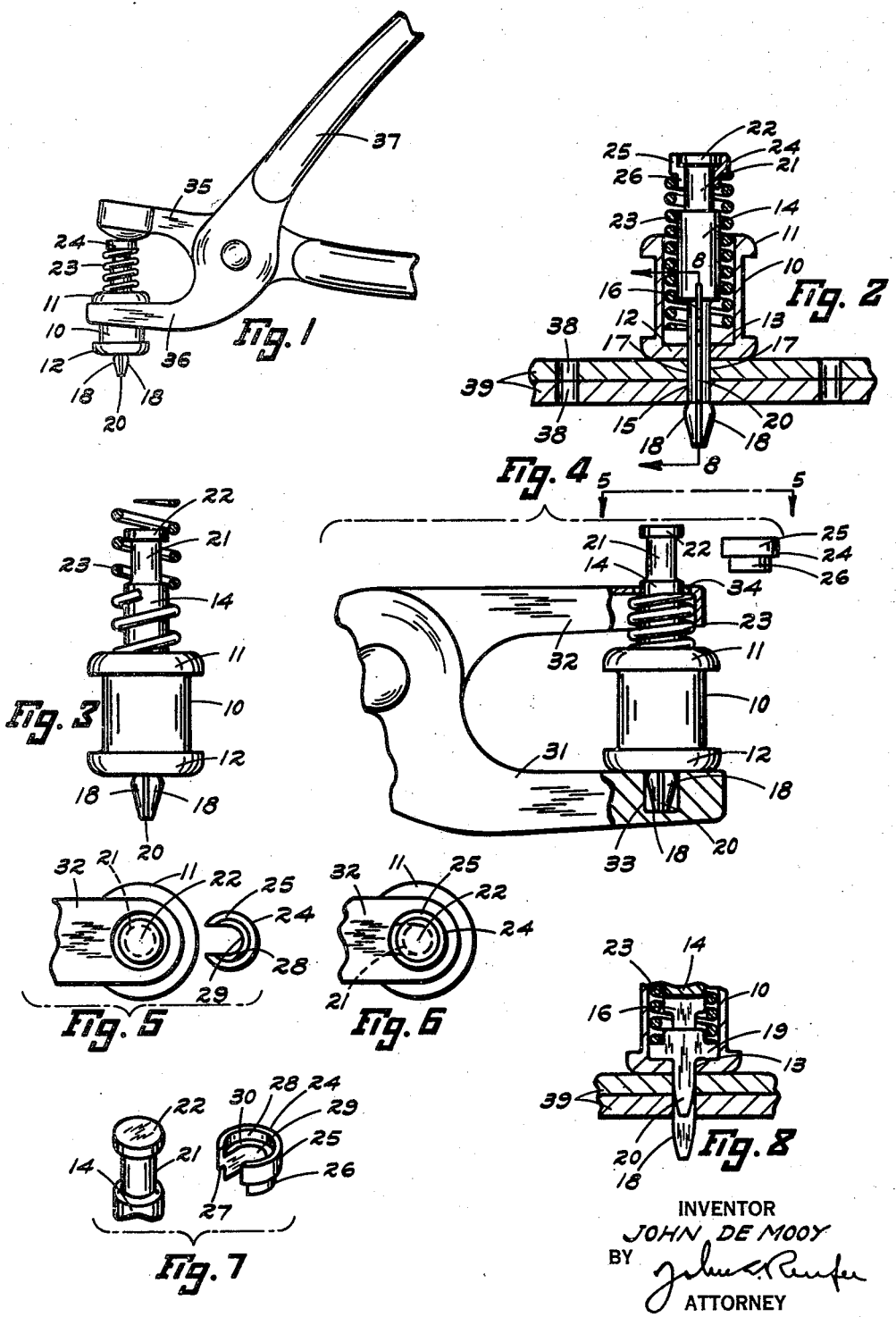

2,379,134

UNITED STATES PATENT OFFICE 2,379,134

TEMPORARY RIVET

John De Mooy, Shaker Heights, Ohio, assignor to The Cleveland Pneumatic Tool Company, Cleveland, Ohio, a corporation of Ohio Application November 29, 1941, Serial No. 420,955

8 Claims. (Cl. 85—5)

This invention relates broadly to a plate fastening device but more particularly to an improved temporary rivet for securing perforated plates in superposed relation preparatory to the riveting thereof.

One object of this invention is to produce a temporary rivet of a type known in the art but constructed in a manner enabling rapid assembly and disassembly of its several parts and consequently resulting in a temporary rivet which may readily be repaired.

Another object of this invention is to produce a repairable temporary rivet forming a simple and compact assembly which is strong, durable and efficient.

In the drawing:

Fig. 1 is a side elevational view of a temporary rivet embodying the invention shown with a portion of a special plier with which the device is applied to and removed from the work.

Fig. 2 is an enlarged view of the device shown partly in section and applied to the work.

Fig. 3 is a side elevational view of the device shown in a partly assembled condition.

Fig. 4 is a side elevational view of the device located between the jaws of a special plier used for assembling and disassembling the device. In this view the temporary rivet is shown ready to receive its detachable head.

Fig. 5 is a top plane view looking in the direction of the arrows 5—5 in Fig. 4.

Fig. 6 is a view corresponding to Fig. 5 but showing the device fully assembled.

Fig. 7 is a perspective view of the upper end of the pin and of its removable head before assembly.

Fig. 8 is a longitudinal cross sectional view taken in a plane indicated by line 8—8 in Fig. 2.

Referring to the drawing, 10 represents a substantially cup-shaped housing terminated at its upper end by an annular bead 11 and at its lower end by a base 12 having a reduced bore 13 extending centrally therethrough. Slidable in the housing is a retaining pin 14 having a reduced portion 15 longitudinally slotted as at 16 to produce two parallel laterally spaced branches or legs 17 each of a substantially half moon cross sectional shape. The branches 17 slide freely through the bore 13 of the housing base 12 and have their free end formed with an enlarged head or knob 18 projecting laterally outward from the normal dimension of the branch and capable of engagement with the underside of the work as will be hereinafter explained.

Located in the slot 16 between the branches 17, there is a spreader 19 resting on the bottom of the housing 10 and having a tail piece 20 extending downwardly therefrom to the extreme end of the knobs 18 when the pin 14 is positioned as shown in Fig. 1.

Near its upper end the pin 14 is provided with a relatively long cylindrical neck 21 of a reduced diameter above which is the permanent head 22 of the pin, shown herein as an annular flange formed at the extreme upper end theretof.

Surrounding the pin 14 there is a compression spring 23 calculated to fit closely between the pin and the inner wall of the housing 10. This spring has its lower end seated on the spreader 19 while its upper end is adapted to engage a removable head 24 of the pin 14, which head, as clearly shown in Fig. 7 is of substantially C-shaped cross sectional configuration and includes exteriorly a partly cylindrical wall 25 of a diameter somewhat smaller than the outside diameter of the spring 23 but larger than its inner diameter. Depending from the semicylindrical wall 25 there is a reduced portion or skirt 26 of a diameter substantially equal to or somewhat smaller than the inner diameter of the spring 23 and forming at the junction with 25 a partly circular seat 27. Internally the C-shaped head 24 is formed with an enlarged diameter 28 about equal to or somewhat larger than the diameter of the pin's permanent head 22, and with a reduced diameter 29 about equal to the diameter of the neck 21 of the pin 14, the junction of the diameters 28 and 29 forming a partly circular shoulder 30 adapted to engage the underside of the flange 22. The total length of the removable head 24 is about equal to the length of the neck 21, while the opening through one side of the removable head is equal in width to the diameter of the neck 21.

When assembling the device, the spreader 19 is first inserted in the slot 16 of the pin 14 and moved to the inner end of the slot. The pin 14 is then inserted through the housing 10, the knobs 18 being of a shape and size calculated to pass through the bore 13 by flexing the legs 17 toward each other, which flexing is not affected by the spreader now located in the inner end of the slot 16.

Subsequently the spring 23 is inserted between the housing 10 and pin 14 and the subassembly positioned between the jaws 31 and 32 of a special plier partly shown in Fig. 4. As shown the jaw 31 is made to receive the base 12 of the housing 10 and is provided with a suitable recess 33 to accommodate the knobs 18 depending from the housing 10. The upper jaw 32 is provided with a bore 34 of a diameter slightly larger than the diameter 25 of the removable head 24 but smaller than the outside diameter of the spring 23, thereby enabling the upper jaw to engage the upper end of the spring 23 for compressing the latter into the position substantially shown in Fig. 4. Thereafter the C-shaped head 24 is inserted laterally on the neck 21 and moved upwardly until the shoulder 30 thereof engages the underside of the flange 22. As the pressure is released from the jaws 31 and 32, the spring 23 will be allowed to expand until its upper end engages the external seat 27 of the removable head 24 and thereby acts on the pin 14 for urging it upwardly relative to the housing 10 causing the pin to assume the position substantially shown in Fig. 1. Removal of the jaw 32 from the pin is effected by the head 24 passing through the bore 34 of the jaw 32. The temporary rivet thus assembled is then removed from the special tool shown in Fig. 4 and ready for operation.

When applying the device to and removing it from the work it is placed between the jaws 35 and 36 of a plier 37, the jaw 36 being slotted to engage the underside of the annular bead 11 while the jaw 35 is adapted to engage the annular flange 22 of the pin 14. Upon movement of the jaws 35 and 36 toward each other, the spring 23 will be compressed and the pin 14 driven downwardly relative to the housing 10 and the spreader 19 resting on the bottom of the housing, which spreader through the downward movement of the pin is now positioned in the inner end of the slot 16. As the pointed end of the pin, that is, the pointed ends of the knobs 18 are inserted into aligned perforations 38 of the work represented by superposed plates 39, the legs 17 will flex sufficiently for the knobs to touch each other, in which instance the shape and size of the knobs will allow them to pass through the perforations 38. When the plier 37 is removed from the device, the spring 23 will drive the pin 14 upwardly relative to the housing 10 to cause engagement of the knobs 18 with the underside of the lower sheet 39, which knobs are now prevented from moving laterally toward each other by the spreader 19 located adjacent thereto, thereby causing the plates 39 to be clamped between the base 12 and knobs 18 with the perforations 38 in perfect alignment since the combined cross sectional area of the legs 17 with the tail 20 of the spreader 19 is substantially equal to that of the perforations 38.

From the foregoing description it will be understood that since the width of the side opening through the C-shaped removable head 24 is about equal to the diameter of the neck 21, the partly circular wall 25 of the head actually surrounds the permanent head 22 of the pin 14 to an extent greater than one-half the periphery of the permanent head, thereby preventing removal of the head from the pin without first sliding the head downward relative to the pin. To further prevent accidental removal of the head 24 from the pin, the upper end of the spring 23 surrounds the skirt 26 of the head, thereby making it necessary to first compress the spring before the head can be removed from the pin. The assembly and disassembly of the device is further simplified by the disposition of the spreader on the bottom of the housing. The spring being seated on the spreader maintaining it in position while enabling a rapid assembly involving no special spreader fastening operation and resulting in a construction wherein the spreader may readily be replaced without the necessity of any machining.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A temporary rivet including a substantially cup-shaped housing having a bore through the bottom thereof, a pin slidable in said housing through said bore, a lateral projection on one end of said pin below said housing, a permanent head on the other end of the pin, a removable head on said pin resting against the under side of permanent head, said removable head including a wall partly surrounding said permanent head and a skirt partly surrounding said pin, a seat at the junction of said wall and skirt, and a compression spring between said housing and removable head having one end resting on said seat, said spring surrounding said skirt and protruding laterally beyond the external marginal edge of said removable head.

2. A temporary rivet including a substantially cup-shaped housing having a bore through the bottom thereof, a pin slidable in said housing through said bore, a permanent circular head on one end of said pin, a removable C-shaped head on said pin resting against the underside of said circular head, said removable head including a wall partly surrounding said circular head to an extent greater than one-half the periphery thereof and a skirt partly surrounding said pin below said circular head, a seat at the junction of said wall and skirt, and a compression spring between said housing and removable head having one end resting on said seat, said spring surrounding said skirt and protruding laterally beyond the external marginal edge of said removable head.

3. A temporary rivet including a housing, a pin slidable in said housing, a permanent circular head on one end of said pin, a removable head on said pin resting against the underside of said circular head, said removable head including a skirt partly surrounding the body of the pin below said circular head, a partly annular seat on said removable head, and a compression spring between said housing and removable head having one end engaging said seat, said spring surrounding said skirt and protruding laterally beyond the external marginal edge of said removable head.

4. A temporary rivet including a housing, a pin slidable in said housing, a permanent circular head on one end of said pin, a removable C-shaped head on said pin resting against the underside of said circular head, said removable head including a wall partly surrounding said circular head to an extent greater than one-half the periphery thereof, a seat on said head below said wall, and a compression spring between said housing and removable head having one end engaging said seat and protruding laterally beyond the external marginal edge of said removable head.

5. A temporary rivet including a housing, a pin slidable in said housing, a permanent circular head on one end of said pin, a removable head having a bore therethrough shaped and dimensioned to fit closely over said circular head and the portion of the pin immediately below said circular head, said removable head having a side opening therethrough of a width substantially equal to the diameter of said pin portion enabling assembly of said removable head on the pin by lateral motion, an external laterally extending seat on said removable head facing toward the other end of said pin, and a compression spring between said housing and removable head having one end engaging said seat.

6. A temporary rivet including a substantially cup-shaped housing having a bore through the bottom thereof, a pin slidable in said housing through said bore, an annular flange forming the end of the pin adjacent said neck, a removable hollow head internally shaped to fit closely over said neck and flange, a side opening through said head enabling its insertion over said neck, a laterally extending seat on said head facing toward the other end of the pin, and a compression spring between said housing and head having one end engaging said seat and surrounding the portion of said head fitted on said pin.

7. A temporary rivet including a substantially cup-shaped housing having a bore through the bottom thereof, a pin slidable in said housing through said bore, a lateral projection on said pin below said housing, a removable head at the upper end of said pin, and a compression spring between said housing and said head for urging the pin upwardly, said spring being of a diameter to engage said head and protrude laterally therebeyond.

8. A temporary rivet including a substantially cup-shaped housing having a bore through the bottom thereof, a pin slidable in said housing through said bore, a lateral projection on said pin below said housing, a removable head at the upper end of said pin, a compression spring between said housing and said head for urging the pin upwardly, said spring being of a diameter to engage said head and protrude laterally therebeyond, and said head having a skirt of smaller diameter than the head for internal engagement with said spring.

JOHN DE MOOY.